(No Model.)
J. SULLY.
GALVANIC BATTERY.
No. 585,854. Patented July 6, 1897.
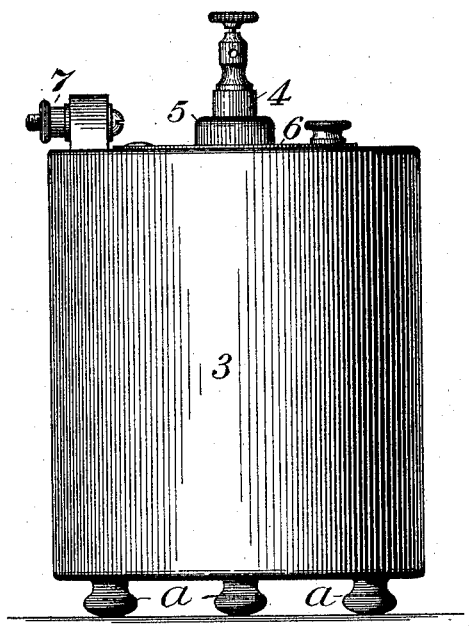
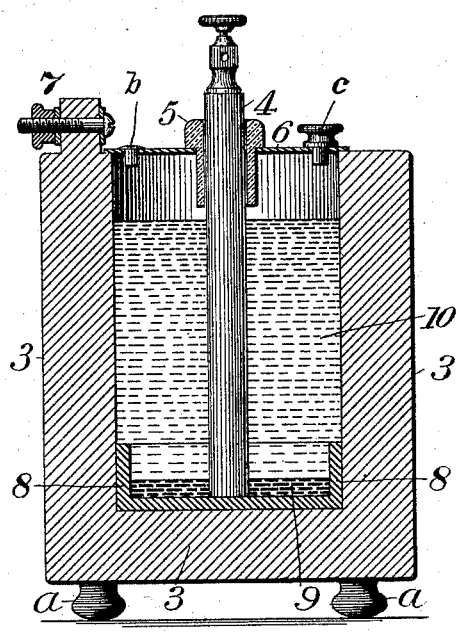
Witnesses.
Inventor.
James Sully

UNITED STATES PATENT OFFICE.

JAMES SULLY, OF NEW YORK, N. Y.

GALVANIC BATTERY.

SPECIFICATION forming part of Letters Patent No. 585,854, dated July 6, 1897.

Application filed October 27, 1896. Serial No. 610,202. (No model.)

*To all whom it may concern:*

Be it known that I, JAMES SULLY, a citizen of the United States, and a resident of New York, in the county of New York and State of New York, have invented certain new and useful Improvements in Galvanic Batteries, of which the following is a specification.

The object of my invention is to produce a galvanic battery of constant electromotive force regardless of the work it performs and in a more simple and economical form than batteries generally now in use. I attain this object by mechanism illustrated in the accompanying drawings, in which—

Figure 1 is a side elevation of one complete cell, showing the containing vessel, which is also the negative electrode, exposed to the air. *a a a* are three porcelain knobs fastened to the bottom of the vessel to insulate it from anything it may rest upon.

Fig. 2 is a vertical section of the cell, in which 3 3 3 mark the walls of the vessel, which are one inch thick; 4, zinc pencil passing through the porcelain ring; 5, porcelain ring; 6, copper cover of vessel supporting porcelain ring; *b b b*, three copper plugs riveted to the cover and projecting underneath the cover to prevent it from slipping off of the cup; *c*, a thumb-screw projecting above the cover as a lifter and under the cover as a fourth plug; 7, binding-post of negative vessel; 8 8, paraffin insulation of the inner bottom of vessel; 9, mercury contained within the paraffin insulation, in which the zinc pencil rests; 10, the electrolytic fluid within the vessel.

To carry my invention into effect, I use as the negative electrode a porous gas-coke-carbon cylindrical cup five and one-half inches high by five inches diameter, left externally uninsulated from the air. The inside of the cup is four and one-half inches deep by three inches diameter, leaving the walls of the cup one inch thich. The inner bottom and about one inch in depth on the sides of the inner bottom of the cup is covered with a thin layer of paraffin, forming an insulating-receptacle for a small quantity of quicksilver, which serves to amalgamate the zinc. The top of the cup has a small elevation, through which a binding-screw is placed to attach to the conducting-wire. The external bottom of the cup is provided with three small porcelain knobs *a* to insulate the cup from anything it may rest upon. The top of the cup is covered with a sheet of copper 6, through the center of which there is an opening to admit a porcelain ring 5. Through this ring the positive electrode, a zinc pencil 4, rests insulated from the copper cover.

Heretofore porous-carbon vessels externally exposed to the air have been used to filtrate an electrolytic fluid through the vessel and by means of a feed and discharge of the fluid to continue the process indefinitely.

In my process I use the fluid without filtration, and in order to leave the carbon porous, so that the fluid may permeate the carbon walls without passing through onto the surface, I polish its external surface by first heating the cup, and then while hot rub over the surface with a small quantity of beeswax. This sufficiently closes the pores to prevent the liquid from coming onto the surface and renders the surface pleasing to sight and clean to handle. The vessel may then be highly polished with a fine wire brush. For the positive electrode I use a zinc pencil. For the electrolyte 10 I use a mixture of carbonate of potash and kerosene-oil.

In order to render the solution of carbonate of potash more stable and less liable to crystallize, thus preventing the salt from accumulating around the conducting-wires of the electrodes, and to thicken the mixture, so that it will not so readily pass into the pores of the carbon, I add to the boiling solution a small quantity of kerosene-oil.

The chemical action of the battery is similar to all zinc-carbon elements. When immersed in a depolarizing-electrolyte, the zinc dissolves apparently without disengagement of hydrogen. I am inclined to believe that the air contained in the pores of the carbon cup acts as a perfect depolarizer.

I have found by experiment that when the electrolyte is permitted to filtrate through the carbon vessel after a considerable time the pores of the vessel become clogged, probably due to the motion of the liquid carrying particles of matter into the pores. This eventually prevents the occlusion of the atmospheric air, and polarization takes place. I have avoided this by preventing the motion of the liquid by partially closing the external pores, so as to prevent its passage onto the surface, and in such a manner as to avoid destroying the porosity of the surface or the porosity of the inner carbon, thus permitting free access of the oxygen of the air to the saturated carbon through the carbon. By polishing the surface of the vessel with beeswax I find that particles of dirt are not so liable to collect upon the surface, which might eventually destroy the porosity of the surface.

In the form that I have constructed this battery, as herein described, the electromotive force is nearly constant for many days on moderately short circuit. It is more simple in construction than any of the closed-circuit cells, contains less destructible matter than batteries generally, and is by far the most economical of the closed-circuit cells.

I have found by experiment that when the walls of the negative carbon cup are less than an inch thick the electromotive force of different cells of the battery varies greatly, probably due to the dissimilar porousness of the different cups, the thin walls being liable to become charred in spots while being baked. My cups with walls an inch thick are practically free from this objection, probably due to a more even baking of the carbon. Consequently the electromotive force of the battery in my cups is greatly improved.

*To prepare the electrolyte.*—To one pound of carbonate of potash add one gallon of water and boil it. While boiling, stir in one-half gill of kerosene-oil. Boil five minutes. When cool, strain through a cotton cloth. Place in glass vessels.

*To prepare the battery.*—Cover the inside bottom of the carbon cup with mercury, (about two ounces.) Fill the cup to within one inch of the top with the solution of potash. Cover the cup, put the porcelain ring through the hole in the copper, and place the positive pencil through the ring. Let it rest on the bottom of the cup in the mercury. Let the outer surface of the cup remain exposed to the air.

Having fully described my invention, what I claim, and desire to secure by Letters Patent, is—

A galvanic-battery cell, composed of a negative, porous, gas-coke, carbon, cylindrical containing vessel, rendered sufficiently dense on its external surface to prevent the passage, onto its surface, of an electrolytic fluid, without destroying the porosity of the surface of the vessel or its inner porosity, and insulated as described; and a positive zinc pencil immersed in an electrolytic fluid of carbonate of potash and kerosene-oil, contained within the carbon vessel, and resting in a small quantity of quicksilver contained within an insulation in the bottom of the vessel, all substantially as described.

Signed at New York, in the county of New York and State of New York, this 26th day of October, A. D. 1896.

JAMES SULLY.

Witnesses:
 MAX TOBIAS,
 ROBERT BETTY.